US006272847B1

United States Patent
Dietrich

(12) United States Patent
(10) Patent No.: US 6,272,847 B1
(45) Date of Patent: Aug. 14, 2001

(54) CENTRIFUGAL DIRECT INJECTION ENGINE

(76) Inventor: Carl C. Dietrich, 35 Brookline St., Cambridge, MA (US) 02139

( * ) Notice: Subject to any disclaimer, the term of this patent is extended or adjusted under 35 U.S.C. 154(b) by 0 days.

(21) Appl. No.: 09/453,345

(22) Filed: Dec. 1, 1999

(51) Int. Cl.[7] .................................................... F02K 9/42
(52) U.S. Cl. .......................................................... 60/258
(58) Field of Search ............................. 60/258, 201, 744

(56) References Cited

U.S. PATENT DOCUMENTS

| 2,395,403 | 2/1946 | Goddard . | |
| 2,536,600 | * 1/1951 | Goddard | 60/258 |
| 2,602,292 | * 7/1952 | Buckland | 60/39.74 |
| 4,232,526 | * 11/1980 | Barbeau | 60/745 |

* cited by examiner

Primary Examiner—Timothy S. Thorpe
Assistant Examiner—Ehud Gartenberg
(74) Attorney, Agent, or Firm—Herbert L. Bello

(57) ABSTRACT

A centrifugal direct injection engine having an open-ended compartment with a combustion chamber at a closed end thereof and an exhaust nozzle at its open end. The compartment is provided with a narrow portion defining a throat that connects the combustion chamber and the exhaust nozzle. A propellant injection manifold is rotatably mounted within the combustion chamber, the propellant injection manifold being configured for rapid rotation within the combustion chamber. The propellant injection manifold includes an upper disk member, an intermediate disk member and a lower disk member, the disks being joined together to form an integral member with the outer perimeter of the disks being in registration with one another. A fuel is introduced into the combustion chamber through the propellant injection manifold and the nozzles. An ignitor is provided for igniting the fuel within the combustion chamber, the nozzles being positioned to cause and sustain rotation of the propellant injection manifold within the combustion chamber after initial ignition of the fuel.

5 Claims, 6 Drawing Sheets

CENTRIFUGAL DIRECT INJECTION ENGINE

BACKGROUND OF THE INVENTION

1. Field of the Invention

The invention relates to aerospace propulsion. In particular, the present invention is directed to a liquid propellant rocket engine apparatus.

2. Description of the Prior Art

The aerospace industry is continuously looking for apparatuses and methods to reduce the cost of launching payloads into space. Presently, the typical launch cost for the injection of a payload into earth orbit is approximately ten thousand dollars per pound of payload. Most of the cost associated with this process is attributable to the large, complex, and expensive systems utilized to operate a launch vehicle.

Recently, there have been a number of attempts to reduce the cost per pound of payload through a combination of innovative vehicle designs and infrastructure developments. Unfortunately, although these efforts have been successful with regard to some areas, the cost per pound of payload continues to remain substantially unchanged. A primary reason for this lack of progress is the fact that most of the current efforts utilize liquid propellant rocket engine designs that are almost four decades old. Utilization of these vintage designs continues due the perceived high cost of developing and exploiting newer launch systems. In addition, cumulative increases in the reliability of these older rocket engine designs, coupled with a familiarity in their maintenance and operation, renders them among the currently preferred launch systems.

It has been noted that the performance characteristics of liquid propellant rocket engines improve as combustion chamber pressures are increased. In order to exploit the effects of increased chamber pressure, liquid propellant rocket engines are either tank pressurized or turbo-pump pressurized.

In a tank pressurized liquid propellant rocket engine, the propellant is pressurized in a main storage tank by either premixing of a small quantity of the propellants or by gas pressurization via the utilization of a chemically inert gas. The advantage of tank-pressurized systems is that is that they are relatively simple to construct. The disadvantage of tank-pressurized systems is that the propellant storage tanks must be designed to withstand extreme pressure and, as a result, are very heavy. This later fact results in a decrease in rocket vehicle performance with a commensurate increase in the cost per pound of payload.

In a turbo-pump pressurized liquid propellant rocket engine, a turbo-pump is employed to pressurize the propellants prior to their injection into the combustion chamber. To this end, measured quantities of propellants are chemically reacted and used to drive a turbine that spins a shaft and drives a centrifugal pump. The pump, in turn, pressurizes the propellants prior to their injection into the combustion chamber. The advantage of a turbo-pump system is that the main propellant storage tanks can be at a very low pressure and, thus, can have a lightweight configuration. The disadvantages of turbo-pump systems are that turbo-pumps are, typically, extremely heavy devices configured to generate and withstand high pressures. Further, turbo-pumps can be extremely complicated and expensive to build because they employ complicated blade geometries that must be cast using specialized techniques.

Recently, development has begun regarding a rocket engine employing as propellant liquid oxygen, commonly referred to as "LOX," and kerosene. These efforts utilize a rocket engine employing a completely ablative nozzle and combustion chamber. In operation, a single-shaft turbo-pump is employed to pressurize the propellants prior to their injection into the combustion chamber. The cost effectiveness of this new design is directly linked to the cost of the turbo-pump system. Thus, the current high cost of the proposed turbo-pump, i.e., in excess of one hundred thousand dollars, continues to limit the effectiveness of these systems in decreasing the cost per pound of injecting a payload into earth orbit or space.

A need exists for a reliable rocket engine apparatus that can be employed with a propellant including liquid oxygen and kerosene that is economical to manufacture and that does not suffer from the foregoing design and cost limitations.

SUMMARY OF THE INVENTION

It is an object of the present invention to provide a centrifugal direct injection engine apparatus that does not suffer from the limitations and disadvantages of prior art apparatuses.

It is a further object of the invention to provide a centrifugal direct injection engine apparatus in the form of a centrifugal direct injection rocket engine apparatus having an ablative nozzle and combustion chamber.

It is yet another object of the present invention to provide a centrifugal direct injection rocket engine apparatus that is easily and economically produced.

Other general and specific objects of the invention will in part be obvious and will in part appear hereinafter.

The centrifugal direct injection rocket engine apparatus of the invention is characterized by at least one self-driven, rotatable propellant injection manifold. The injection manifold is positioned within a combustion chamber of the rocket engine. In operation, the rocket engine apparatus of the invention can produce approximately 200 pounds of thrust. Preferably, the thrust output of the rocket engine apparatus of the invention is scalable for a given application. Preferably, the propellant fuel mixture, liquid oxygen, commonly referred to as "LOX," and kerosene, is pressurized by a single rotating injection manifold. In the preferred embodiment of the invention, a completely ablative nozzle and combustion chamber are employed.

The injection manifold is rotatably mounted within the combustion chamber and can include a top or upper disk element, a middle or intermediate disk element, and a bottom or lower disk element. The disk elements are interconnected so as to form a unitary body.

The upper disk element typically includes an inlet element in fluid communication with a series of nozzle elements. The inlet element is configured to receive kerosene or other similar propellant. The nozzle elements are configured to provide an egress through which an aerosolized kerosene spray can exit the injection manifold and enter the combustion chamber.

Structurally, the intermediate disk element generally includes an inlet element, a settling chamber, and a series of outlet elements. The inlet element is configured to receive liquid oxygen or other similar propellant. The outlet elements, i.e., nozzle elements, provide exhaust portals through which oxygen in a gaseous state can exit the intermediate disk element. These nozzle elements, like those utilized in connection with the kerosene propellant component, are positioned so that the exiting oxygen gas causes this disk element, and those connected to it, to rotate. More particularly, these nozzle elements of this disk preferably are oriented so that the forces generated by the exiting oxygen gas are oriented substantially perpendicularly, and tangentially, to the axis about which the injection manifold rotates so as to cause the existing oxygen jet to impart a torque on the manifold.

The lower disk element includes a series of heat exchange channel elements which function to heat the liquid oxygen propellant prior to its ignition in the combustion chamber. More particularly, liquid oxygen enters the heat exchange channel elements of the lower disk element via passages extending between the intermediate disk element and lower disk element. As the liquid oxygen passes through the heat exchange channel elements, it is vaporized by means of heat transfer from the combustion chamber. The heated oxygen is then directed back into the intermediate disk element. More particularly, the gaseous oxygen is directed into the settling chamber in the intermediate disk element via ports extending between the lower disk element and intermediate disk element. Typically, the lower disk element includes an inert polymer insert element. This insert element maintains the oxygen in its liquid state as it passes from the intermediate disk element into the lower disk element.

In operation, the kerosene and oxygen exiting the nozzles in the upper disk element and intermediate disk element, respectively, is directed into a combustion chamber. The kerosene and oxygen are mixed in the combustion chamber, the mixture is initially ignited by an ignitor element. The ignited mixture is then directed through a restricted opening, or throat element, from the combustion chamber and out through a nozzle element. After initial ignition, combustion is self-sustaining.

The rocket engine apparatus of the invention combines the performance advantage of a turbo-pump fed liquid propellant rocket engine apparatus with a dimensionally reduced, and mass efficient, design. The economic advantage of the rocket engine apparatus of the invention is further augmented by its simple and cost-effective design. For example, the rocket engine apparatus of the invention provides improvements in both propellant mixing, resulting from the swirling injection of propellants, and engine construction costs, resulting from the elimination of turbine or centrifugal pump blades. All together, integration of all of the features of a turbo-pump fed liquid propellant rocket engine apparatus into a single, spinning propellant injection manifold located inside the combustion chamber produces a rocket engine apparatus having improved operational and economical characteristics. Indeed, reduction in the weight of the launch vehicle with which the rocket engine apparatus of the invention is utilized, as a result of the reduction in weight resulting from the elimination of high-pressure propellant tanks and feed lines, allows the rocket engine apparatus of the invention to lift larger payloads into earth orbit and/or space at a lower cost. This, in turn, reduces the cost per pound of payload and, thus, produces a more economically efficient launch vehicle.

The above and other objects, features and advantages of this invention will be more readily apparent from a reading of the following detailed description of various aspects of the invention taken in conjunction with the accompanying drawings.

The invention accordingly comprises the steps and apparatus embodying features of construction, combinations of elements and arrangements of parts adapted to affect such steps, as exemplified in the following detailed disclosure, the scope of the invention being indicated in the accompanying claims.

BRIEF DESCRIPTION OF THE DRAWINGS

A fuller understanding of the nature and objects of the present invention will become apparent upon consideration of the following detailed description taken in connection with the accompanying drawings in which.

DETAILED DESCRIPTION OF THE PREFERRED EMBODIMENTS

Referring now to the several FIGURES wherein like reference numbers refer to like elements there is shown a centrifugal direct injection rocket engine apparatus 10 embodying the present invention. The rocket engine apparatus 10 includes at least one rotatable propellant injection manifold 12. The injection manifold 12 is positioned within the combustion chamber 14 of the rocket engine apparatus 10. The rocket engine apparatus 10 is capable of producing approximately 200 pounds of thrust. The propellant mixture typically utilized in connection with the rocket engine apparatus 10 of the invention is a mixture of liquid oxygen, commonly referred to as "LOX," and kerosene. These materials are pressurized by a single shaft rotating manifold. In the preferred embodiment, the rocket engine apparatus 10 has a completely ablative nozzle 32 and combustion chamber 14.

Figure 1:
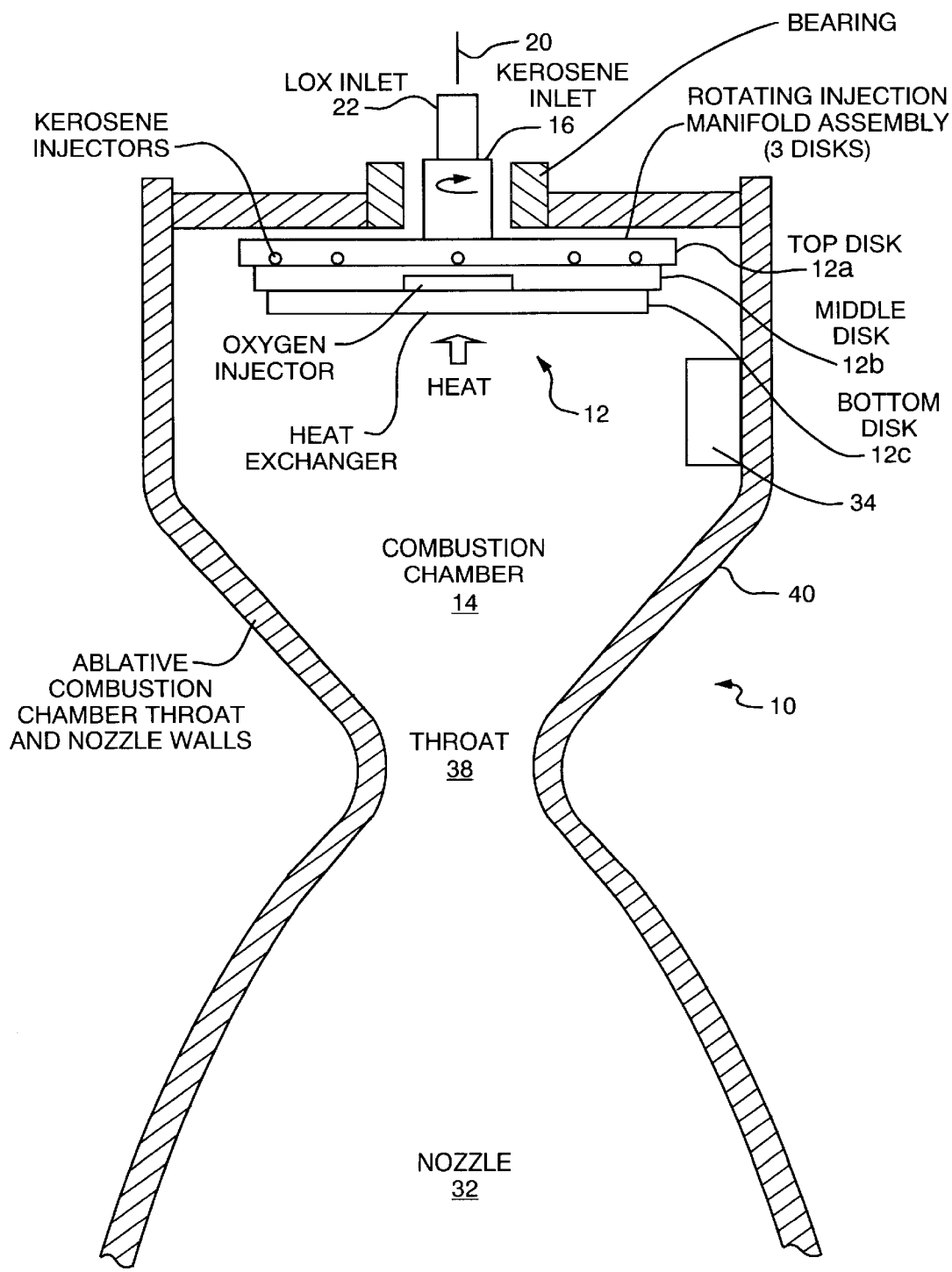
FIG. 1 is a side, cutaway view of a rocket engine apparatus embodying the invention.

As shown best in FIG. 1, the rocket engine apparatus 10 includes a combustion chamber 14 having rotatably mounted therein an injection manifold 12. The injection manifold 12 includes a top or upper disk element 12A, an intermediate or middle disk element 12B, and a lower or bottom disk element 12C. The disk elements are interconnected.

Figure 2:
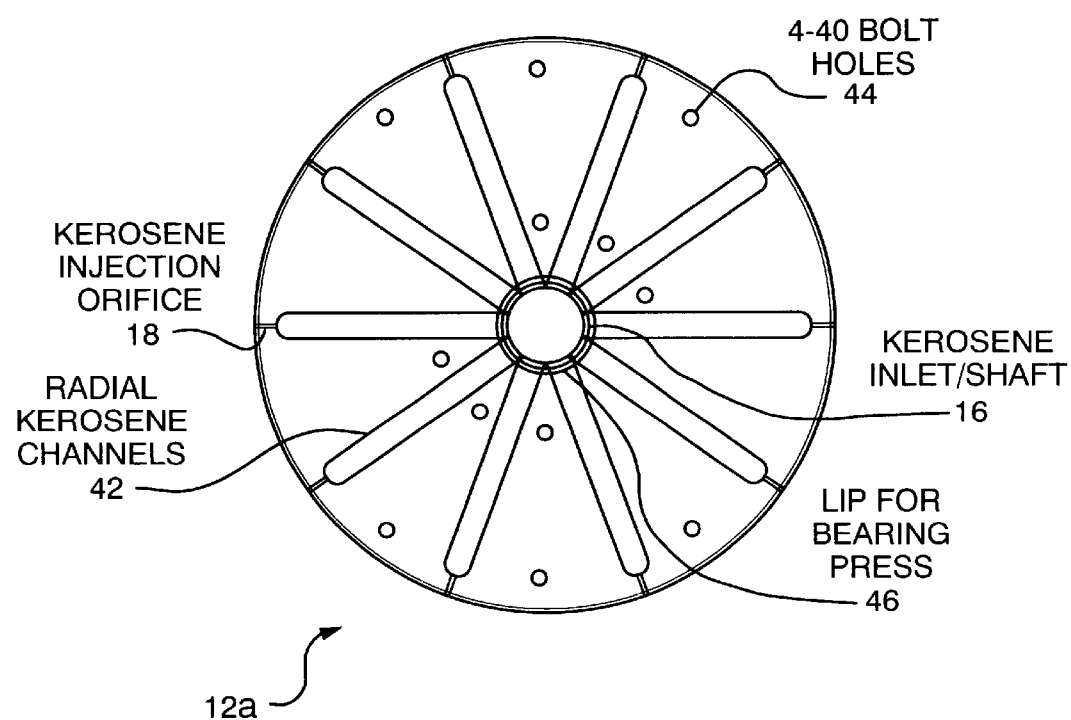
FIG. 2 is a bottom plan view of the upper disk element of the injection manifold used in connection with the rocket engine apparatus of the invention shown in FIG. 1.

Referring now to FIG. 2, it will be seen that the upper disk element 12A or kerosene disk includes an inlet element 16 into which kerosene is pumped and a series of outlet nozzle elements 18 though which kerosene, in a spray, exits.

Figure 3:
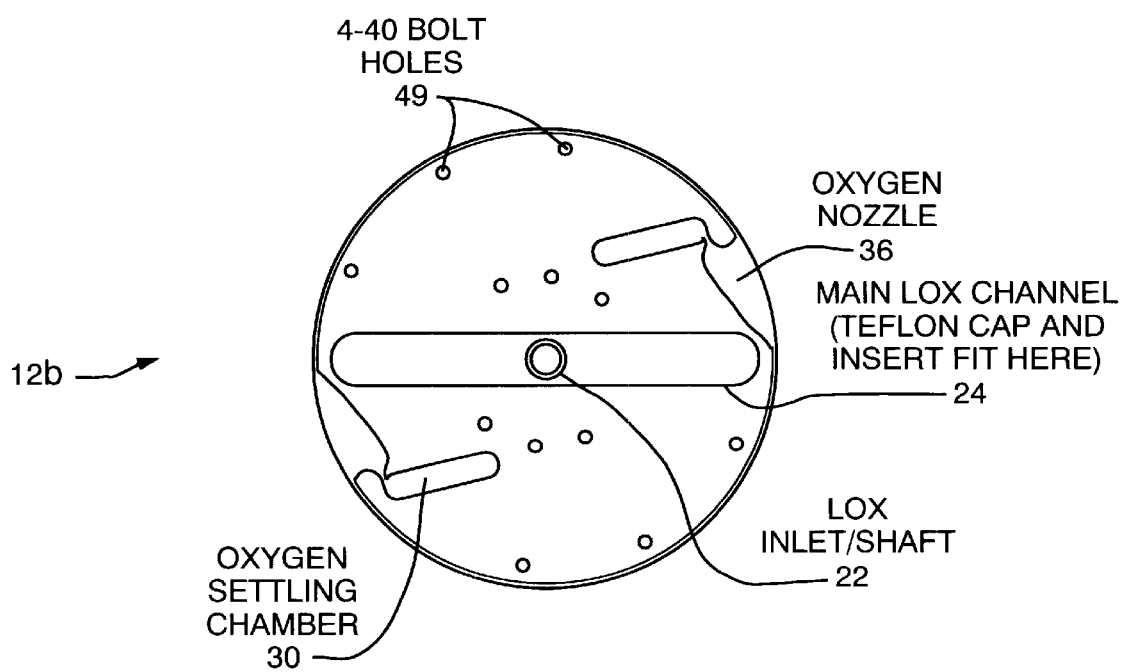
FIG. 3 is a top plan view of a first embodiment of the intermediate disk element of the injection manifold used in connection with the rocket engine apparatus of the invention shown in FIG. 1.
Figure 4:
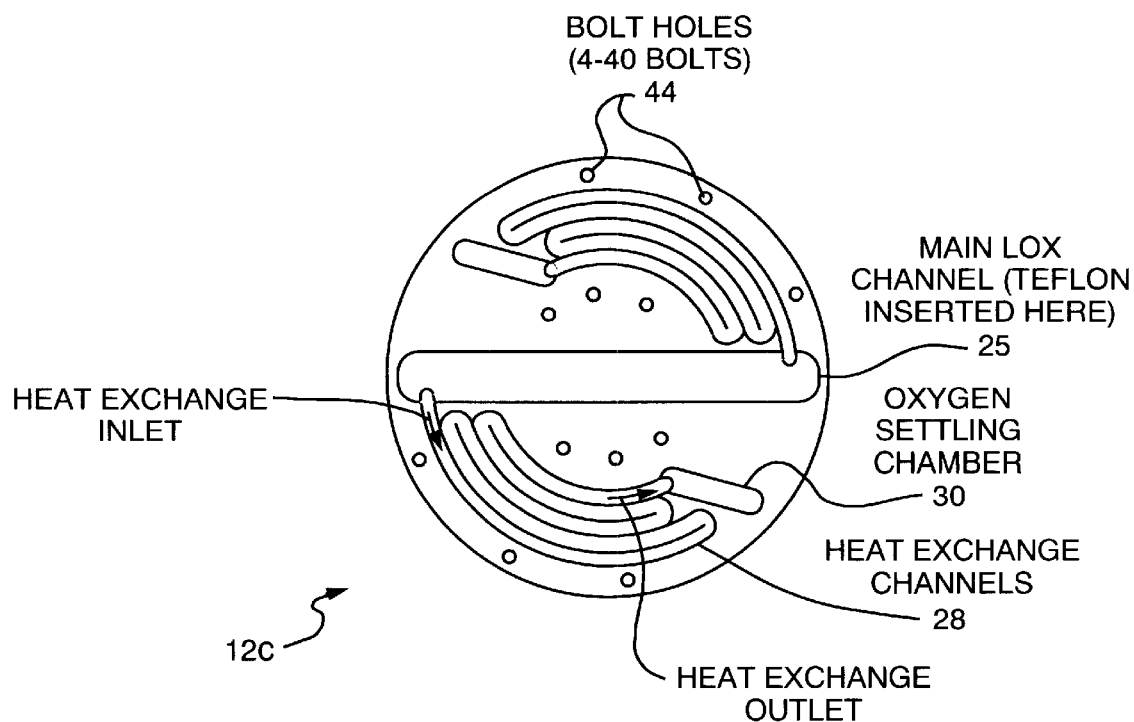
FIG. 4 is a top plan view of the lower disk element of the injection manifold used in connection with the rocket engine apparatus of the invention shown in FIG. 1.

As shown in FIGS. 3 and 4, the intermediate disk element 12B includes an inlet element 22 into which liquid oxygen flows. The liquid oxygen exits the intermediate disk element 12B for the lower disk element 12C via at least one exhaust port 24. The liquid oxygen is then received in a channel 28 in the lower disk element 12C. Next, the oxygen passes through arcuate heat exchange channels 28 in the lower disk element 12C. As the oxygen passes through these channels, it is heated. The heated, oxygen vaporizes and then exits the lower disk element 12C and enters the intermediate disk element 12B via at least one intake port 30 in the intermediate disk element 12B. The heated oxygen then exits the intermediate disk element 12B through nozzles 36 in the intermediate disk element 12B. The nozzles 36 are positioned so that the exiting oxygen gas causes the intermediate disk element 12B to rotate.

Figure 5:
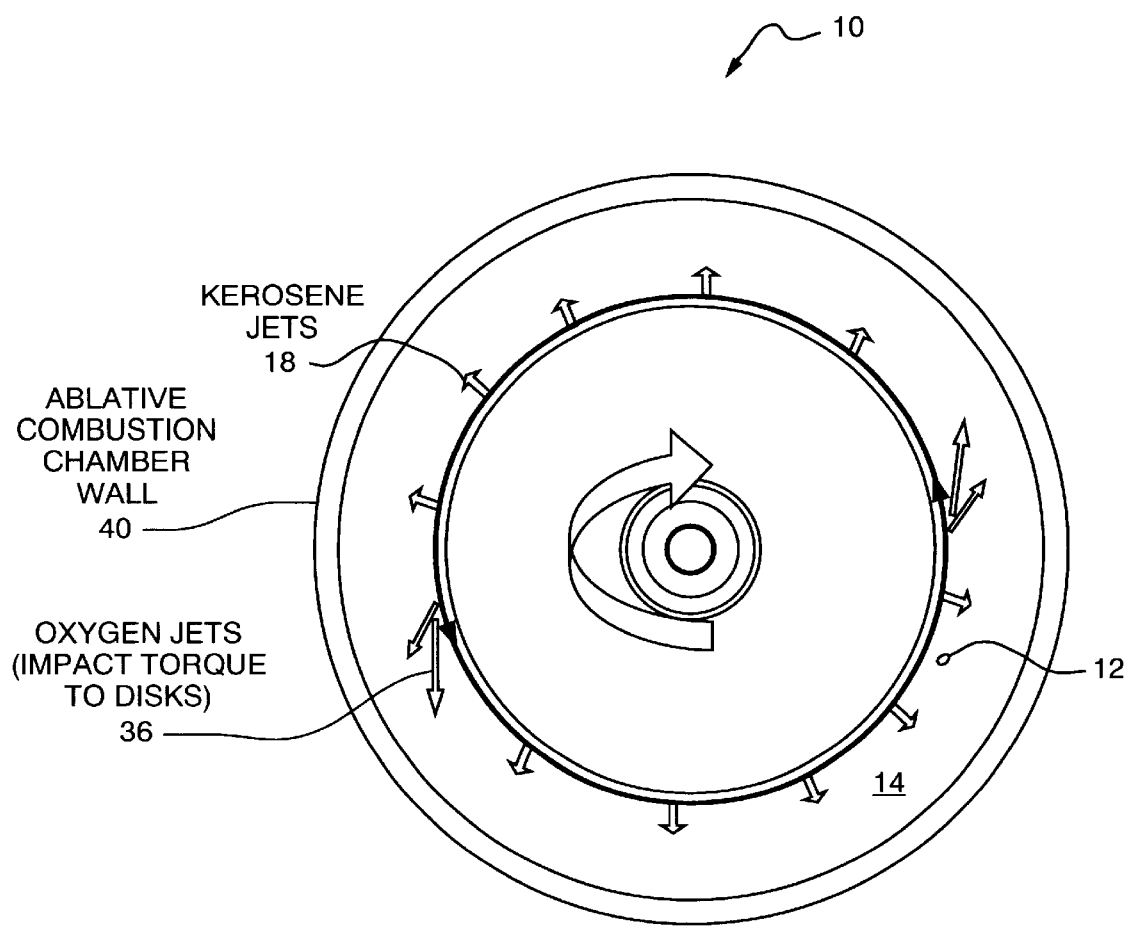
FIG. 5 is a perspective view of the injection manifold used in the connection with the rocket engine apparatus of the invention shown in FIG. 1 schematically depicting the release of kerosene and liquid oxygen into the combustion chamber of the rocket engine apparatus of the invention shown in FIG. 1.

An insert or channel liner 27 composed of an inert polymer, for example, a fluorocarbon polymer such as polytetrafluoroethylene that is sold under the trademark TEFLON, keeps the oxygen in its liquid state as it passes through the intermediate disk element 12B into the lower disk element 12C for heating. The insert is positionable in the main liquid oxygen channel 25, containing the exhaust port 24, as shown in FIG. 5. The kerosene and oxygen exiting the nozzles 18 and 36, respectively, in the upper disk element 12A and intermediate disk element 12B, respectively, is directed into a combustion chamber 14 where they are mixed and ignited by an ignitor element 34. The ignited mixture is directed through a passage 38, i.e., a throat, which provides a fluid connection between the combustion chamber 14 and nozzle 32. After initial ignition, the combustion is self-sustaining.

In the currently preferred embodiment of the invention, the engine apparatus 10 is configured to burn a liquid bi-propellant of liquid oxygen and kerosene. The combustion chamber 14 and nozzle 32 are made from ablative material. Typical ablative materials used for the combustion chamber 14 and nozzle 32 include graphite fiber in a phenolic resin, silica fibers in phenolic resin, and pure graphite. In the currently preferred embodiment of the invention, the inner wall surface 40 of the combustion chamber 14 is manufactured from a silica-phenolic material in a tape form that is approximately 0.062 (+/−0.01) inches thick. In addition, the inner wall 40 of the combustion chamber 14 has a 0.250 (+/−0.01) inch thick graphite-epoxy outer covering that is primarily composed of unidirectional graphite fibers wrapped around the silica so as to support the hoop stress of the chamber 14, throat 38, and nozzle 32.

Currently, the nominal design chamber pressure for the combustion chamber 14 is between approximately thirty (30) and approximately fifty (50) atmospheres. However, due to the small size of the engine the combustion chamber 14 currently in use, pressure varies greatly over the course of a burn due to the ablation of the throat 38 of the nozzle 32. For example, at the end of a ninety (90) second burn the combustion chamber 14 pressure is predicted to have decreased to about ten (10) atmospheres. Those skilled-in-the-art will appreciate that this phenomenon will not occur to such a great extent in larger engine designs.

As shown best in FIGS. 2 through 5, propellant injection manifold 12 preferably has a disk shape. In addition, the injection manifold 12 has two concentric propellant inlets 16 and 22 in the form of concentric shafts centered on the axis of rotation 20. The injection manifold 12 generally is manufactured from three (3) pieces of aluminum which were first turned down on a CNC lathe. Next, the radially extending internal kerosene channels 42 milled into the inside faces of the disk shaped pieces by a CNC milling machine.

To complete the manufacturing process, the three (3) aluminum disks are stacked and bolted together through vertical holes 44 in order to form the rotating propellant injection manifold 12. The total cost of the three (3) aluminum pieces that make up the core of the injection manifold 12 is generally in the range of about one to three thousand dollars. This cost is trivial in the scope of most engine development projects, and yet the rotating injection manifold 12 is the core of the centrifugal direct injection engine apparatus 10 of the invention.

Referring now to FIG. 2, the top or upper disk element 12A contains the outer kerosene inlet 16, ten (10) radially extending kerosene channels 42, and small horizontal injector holes drilled from the outer edge of the disk to the end of the kerosene channels 18. In this prototype the shaft has a small lip, or notch, 46 in it so it can be pressed onto a bearing.

As shown in FIGS. 3 and 4, the middle or intermediate disk element 12B contains the long narrow liquid oxygen shaft/inlet 22, the top half of a center (main) channel which contains the Teflon insulating channel liner 27, and the oxygen injection nozzles 36. The oxygen injection nozzles 36 are 2-dimensional supersonic expansion injection nozzles that, like all the other channels, were end-milled into the disk by a CNC milling machine. The insulating Teflon channel liner 27 has a "U" shaped channel at the tips (not shown). The highest pressure point in the entire injection manifold is at the base of the "U" channels in the Teflon channel. In operation, the "U" channels prevent the liquid oxygen from back-flowing due to vapor-lock or surge in the system.

The bottom or lower disk element 12C contains the heat exchange channels 28 that serve to increase the enthalpy of the oxygen. Approximately twenty (20) kilowatts of heat energy is transferred through the lower disk element 12C.

When the three pieces of the injection manifold 12 are stacked together and assembled, the manifold is approximately 13 centimeters in diameter and approximately 1.8 centimeters tall. It is designed to run at a steady state operating speed of approximately 30,000 revolutions per minute, and it will pump approximately 0.3 kilograms per second of propellant with an oxidizer to fuel mass ratio of around 2.25. The outer diameter of the kerosene shaft is approximately 2.54 centimeters (1 inch) and it doubles as the shaft of a gas journal bearing and rotating seal.

Low pressure liquid oxygen feeds into the inner shaft 22. Upon reaching the bottom of the shaft 22 it is redirected by the center, insulating Teflon channel liner 27 toward the outer rim of the injection manifold 12. As the liquid oxygen flows toward the edge of the injection manifold 12 it is pressurized by the Coriolis and Centripetal accelerations provided by the walls of the channel liner 27. The pressurization is the same as is found in a spinning centrifugal pump, but unlike the centrifugal pump, the channel liner 27 is entirely contained inside the rotating manifold 12 and the fluid is not released at the edge. Since the channel liner 27 is insulated, the oxygen remains in a liquid form and the pressure at any distance along the channel liner 27 is therefore given by the formula:

$$P=(\tfrac{1}{2})\tilde{n}\tilde{u}^2 r^2$$

Where $\tilde{n}$ is the density of the fluid (1140 kg/m$^3$ for liquid oxygen, approximately 810 kg/m$^3$ for kerosene), $\tilde{u}$ is the angular velocity of the spinning injection manifold in radians per second, and r is the radius at which the pressure is desired to be known.

The oxygen that flows through a "U" shaped channel that contains the highest pressure point in the entire engine because of the maximum radius at the base of the "U." In the current design this radius is approximately 0.06 meters yielding a pressure of approximately 200 atm.

The liquid oxygen is then run through an expander cycle on the bottom face of the disk whereby after being made a supercritical fluid by the increase in pressure, the enthalpy of the liquid oxygen is increased in heat exchange passages 28 milled into the bottom disk. The higher temperature oxygen is now closer to a compressible gas than a liquid and it is exhausted through supersonic nozzles 36 in a tangential direction so as to impart the necessary torque to spin the manifold and pump the propellants.

The kerosene is fed at low pressure to the outer concentric feed tube/inlet 16 which has been machined into the top disk of the injection manifold 12. The shaft doubles as a bearing surface. From there the kerosene is channeled directly out to the edge of the injection manifold 12. During this process it is pressurized in the same way that the liquid oxygen was pressurized. The kerosene is then injected in a radial direction into the combustion chamber through small holes 18 drilled in the edge of the kerosene disk 12A.

The injected oxygen and kerosene are effectively injected in a manner so that one is counter-swirling against the other, thereby improving the mixing of the propellants and allowing for a shorter combustion chamber 14.

In operation the injection manifold 12 is spun up and cooled down by external means and then the valves to the kerosene and liquid oxygen are opened. Upon entry of some liquid the injection manifold 12 will immediately slow down. The injected kerosene and oxygen will be lit by the ignitor 34 when combustion starts, the heat from the combustion will vaporize liquid oxygen in the heat exchange passages 28 and the injection manifold 12 will spin up again to its nominal design operating speed. There is no throttle control. The rocket engine apparatus 10 will burn until the main valves are closed or until the fuel runs out.

Figure 6:
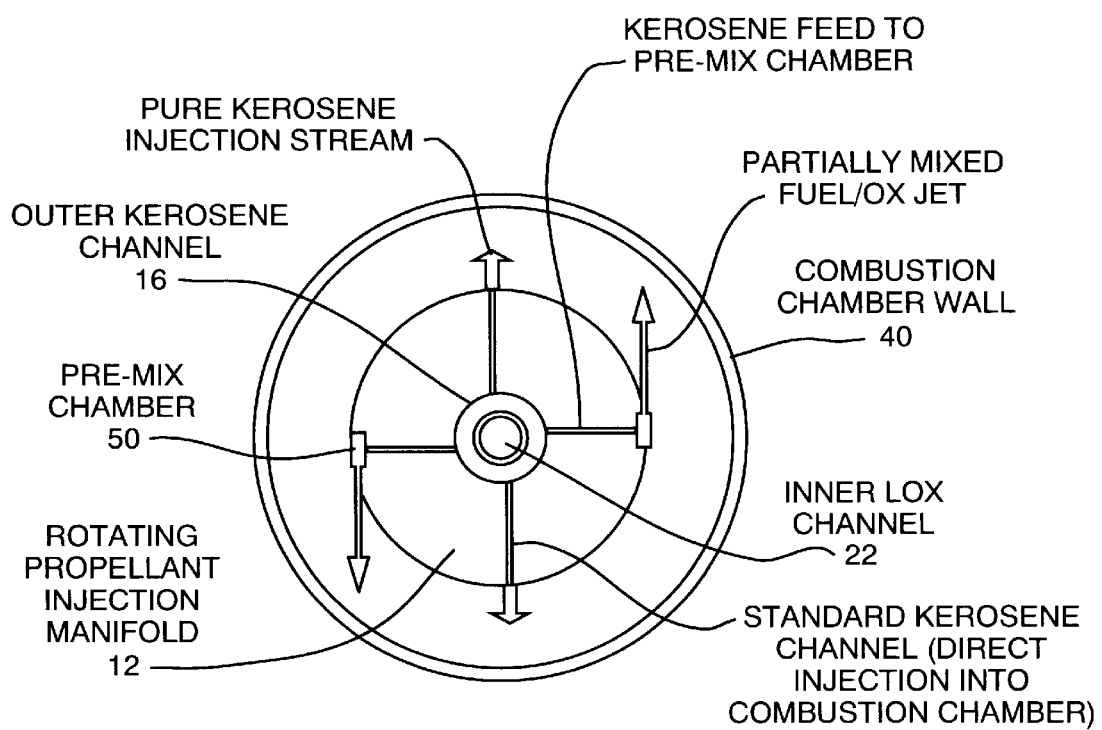
FIG. 6 is a top plan view of a second embodiment of the intermediate disk element of the injection manifold used in connection with the rocket engine apparatus of the invention shown in FIG. 1.

An alternative embodiment of the invention employs an alternative configuration for the settling chamber. As shown best in FIG. 6, in this embodiment of the invention, the middle or intermediate disk element 12B includes a series of premix chambers 50 located near the edge of the injection manifold 12. These premix chambers 50 are in fluid connection with both the kerosene channels 42 of the top or upper disk element 12A and the liquid oxygen heat exchange passages 28 of the bottom, or lower, disk element. One advantage of this design is the fact that it does not rely on heat transfer from the combustion chamber 14 for operation while it continues to permit the liquid oxygen to cool the walls of the injection manifold 12. In addition, in this embodiment of the invention, the enthalpy is increased by both the heat transfer and chemical energy release in the premix chambers 50.

Although in the currently preferred embodiment the preferred propellant is a mixture of kerosene and liquid oxygen, those skilled-in-the-art will appreciate that it is possible to design a centrifugal direct injection rocket engine apparatus 10 that runs on a propellant formed from almost any other liquid propellant combination including hypergolics, storables, and cryogenics. In addition the technology is completely scaleable. Thus, the rocket engine apparatus 10 may be scaled up or down in order to develop a rocket engine apparatus 10 that produces virtually any range of thrust.

Finally, there is also the possibility of generating electricity by mounting magnets or coils into the spinning shaft; in this manner a centrifugal direct injection rocket engine apparatus 10 could provide electricity for the launch vehicle or spacecraft during ascent.

It will thus be seen that the invention efficiently attains the objects set forth above, among those made apparent from the preceding description.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A centrifugal direct injection engine comprising:
   a) an open-ended compartment having a combustion chamber at a closed end thereof, an exhaust nozzle at its open end and a narrow portion defining a throat being disposed between said combustion chamber and said exhaust nozzle;
   b) a propellant injection manifold rotatably mounted within said combustion chamber, said propellant injection manifold configured for rapid rotation within said combustion chamber;
   c) said propellant injection manifold having a plurality of nozzles;
   d) means for introducing a fuel and an oxidizer into said combustion chamber through said propellant injection manifold and said nozzles in said propellant injection manifold, the fuel and oxidizer mixing in said combustion chamber; and
   e) said propellant injection manifold being formed with a plurality of heat exchange channels for heating the oxidizer introduced through said propellant injection manifold and said nozzles into said combustion chamber;
   f) means for igniting the fuel and oxidizer mixture within said combustion chamber;
   g) at least a portion of said nozzles positioned to cause and sustain rotation of said propellant injection manifold within said combustion chamber after initial ignition of the fuel, whereby combustion is said combustion chamber is self-sustaining.

2. The centrifugal direct injection engine as claimed in claim 1 wherein said propellant injection manifold includes an upper rotating portion, an intermediate rotating portion and a lower rotating portion, said lower rotating portion formed with a plurality of heat exchange channels for heating the oxidizer introduced into said combustion chamber, whereby combustion in said combustion chamber is self-sustaining.

3. The centrifugal direct injection engine as claimed in claim 2 wherein said upper rotating portion includes a first inlet and a plurality of first outlet nozzles, said first inlet adapted to receive a first fuel, the first fuel exiting said first outlet nozzles of said upper rotating portion as a spray that is injected into said combustion chamber.

4. The centrifugal direct injection engine as claimed in claim 3 wherein said intermediate rotating portion includes a second inlet, a settling chamber and a plurality of second outlet nozzles, said second inlet adapted to receive the oxidizer, the oxidizer received in said second inlet of said intermediate portion being directed to said heat exchange channels for heating the oxidizer the heated oxidizer being directed through said settling chamber into said second outlet nozzle of said intermediate rotating portion, the oxidizer exiting said second outlet nozzles of said intermediate rotating portion entering said combustion chamber, said second outlet nozzles of said intermediate rotating portion being oriented to rotate said intermediate rotating portion in a first direction.

5. The centrifugal direct injection engine as claimed in claim 4 including an insert composed of an inert material, said intermediate rotating portion and said lower rotating portion formed with a channel that is configured to receive said insert, the oxidizer received in said second inlet being in a liquid state, said insert maintaining the oxidizer in its liquid state as the oxidizer is directed through said intermediate rotating portion into said heat exchange channels.

* * * * *